US012571363B2

(12) United States Patent

Higaki et al.

(10) Patent No.: US 12,571,363 B2
(45) Date of Patent: Mar. 10, 2026

(54) INTAKE MANIFOLD

(71) Applicant: MIKUNI CORPORATION, Tokyo (JP)

(72) Inventors: Toshinori Higaki, Odawara (JP); Takayuki Hayashi, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 18/778,411

(22) Filed: Jul. 19, 2024

(65) Prior Publication Data

US 2025/0027467 A1 Jan. 23, 2025

(30) Foreign Application Priority Data

Jul. 21, 2023 (JP) ................................ 2023-119305

(51) Int. Cl.
*F02M 35/10* (2006.01)
*F02M 35/104* (2006.01)
*F02M 35/112* (2006.01)

(52) U.S. Cl.
CPC .... *F02M 35/10039* (2013.01); *F02M 35/104* (2013.01); *F02M 35/112* (2013.01)

(58) Field of Classification Search
CPC . F02M 35/10039; F02M 35/104; F02M 5/112
See application file for complete search history.

(56) References Cited

U.S. PATENT DOCUMENTS 8,459,226 B2 * 6/2013 Moetakef ................ B29C 66/61 123/184.21
8,631,784 B2 * 1/2014 Brand .............. F02M 35/10078 123/456
12,253,054 B1 * 3/2025 Rolland ........... F02M 35/10327
2008/0283015 A1 * 11/2008 Sato ................... F02M 35/1165 123/184.48
2012/0103295 A1 * 5/2012 Owen ................. B29C 65/0618 428/161
2022/0381207 A1 * 12/2022 Furutani .......... F02M 35/10321

FOREIGN PATENT DOCUMENTS

JP 2022-054472 4/2022

* cited by examiner

*Primary Examiner* — Syed O Hasan
(74) *Attorney, Agent, or Firm* — STAAS & HALSEY LLP

(57) ABSTRACT

In an intake manifold made of a resin and including: a surge tank 2 applied to an engine, an intake air flowing into the surge tank 2; and branch pipes **3*a* and 3*b* branched from the surge tank 2 and connected to intake ports of the engine, a pillar portion 20 penetrating through an internal space of the surge tank 2 and connecting an inner wall 12 and an outer wall 13 facing each other is included, and a cross section perpendicular to an extending direction of the pillar portion 20 has an oval shape elongated in an passing direction of the intake air inside the surge tank 2**.

6 Claims, 8 Drawing Sheets

INTAKE MANIFOLD

CROSS-REFERENCE TO RELATED APPLICATIONS

This application is based on and hereby claims right of priority benefit under 35 USC 119 to Japanese Application No. 2023-119305, filed Jul. 21, 2023, in the Japan Patent Office, the entire contents of which are incorporated herein by reference.

BACKGROUND OF THE INVENTION

Field of the Invention

The present invention relates to an intake manifold used in an engine.

Description of the Related Art

In recent years, intake manifolds made of resins have been widely used in engines. For example, Japanese Patent Laid-Open No. 2022-54472 describes an intake manifold made of a resin and used in a multicylinder engine used in an outboard motor or the like. In the intake manifold, a surge tank and branch pipes branched from the surge tank and extending to cylinders are integrally configured.

However, an intake manifold used in a relatively large engine such as an outboard motor, for example, has a problem that it is difficult to sufficiently obtain a pressure resisting strength since the intake manifold is made of a resin while the size of the intake manifold increases with the size of the engine.

Although enhancing the pressure resisting strength of the intake manifold by providing a pillar connecting wall surfaces facing the center portion of the surge tank is thus conceivable, there is a problem that an intake flow inside the surge tank is disturbed by the pillar, and a pressure loss increases, that is, intake performance is degraded.

The present invention has been made in view of such a problem, and provides an intake manifold improving a pressure resisting strength and reducing a pressure loss.

SUMMARY OF THE INVENTION

In order to achieve the above object, an intake manifold according to the invention is an intake manifold to be applied to an engine with a plurality of cylinders including: a surge tank into which intake air flows; and branch pipes branched from the surge tank and connected to intake ports of the engine, in which the surge tank includes an internal space formed between a first wall surface and a second wall surface facing each other, the first wall surface and the second wall surface are connected with a pillar portion penetrating through a substantially center portion of the internal space, and a cross section perpendicular to an extending direction of the pillar portion has an oval shape elongated in a passing direction of the intake air in the internal space.

Preferably, a plate-shaped reinforcing rib connecting the pillar portion to at least one of the first wall surface and the second wall surface is included, and the reinforcing rib is disposed to extend in the passing direction in the internal space.

Preferably, the pillar portion has a different cross-sectional area of the cross section depending on a position in the extending direction of the pillar portion.

Preferably, the intake manifold is configured by connecting a first member including any one of the first wall surface and the second wall surface to a second member including the pillar portion and the other of the first wall surface and the second wall surface.

Preferably, the intake manifold is formed of a resin.

According to the intake manifold of the present invention, it is possible to enhance strength of the pillar portion itself by elongating a diameter in one direction as compared with a pillar portion with a circular cross section by including the pillar portion with an oval cross section at the center portion of the surge tank. Also, an end portion of the pillar portion connected to the first wall surface or the second wall surface is elongated in one direction to obtain an oval shape, and it is thus possible to increase the circumferential distance and the area of the end portion of the pillar portion and to enhance strength of a connecting portion between the end portion of the pillar portion and the first wall surface or the second wall surface. It is thus possible to enhance the pressure resisting strength of the entire intake manifold.

Furthermore, it is possible to curb disturbance of an intake flow and to curb an increase in pressure loss by forming the section of the pillar portion into the long shape along the intake flow inside the surge tank of the intake manifold.

DETAILED DESCRIPTION OF THE INVENTION

Hereinafter, an embodiment of the present invention will be described based on the drawings.

Figure 1:
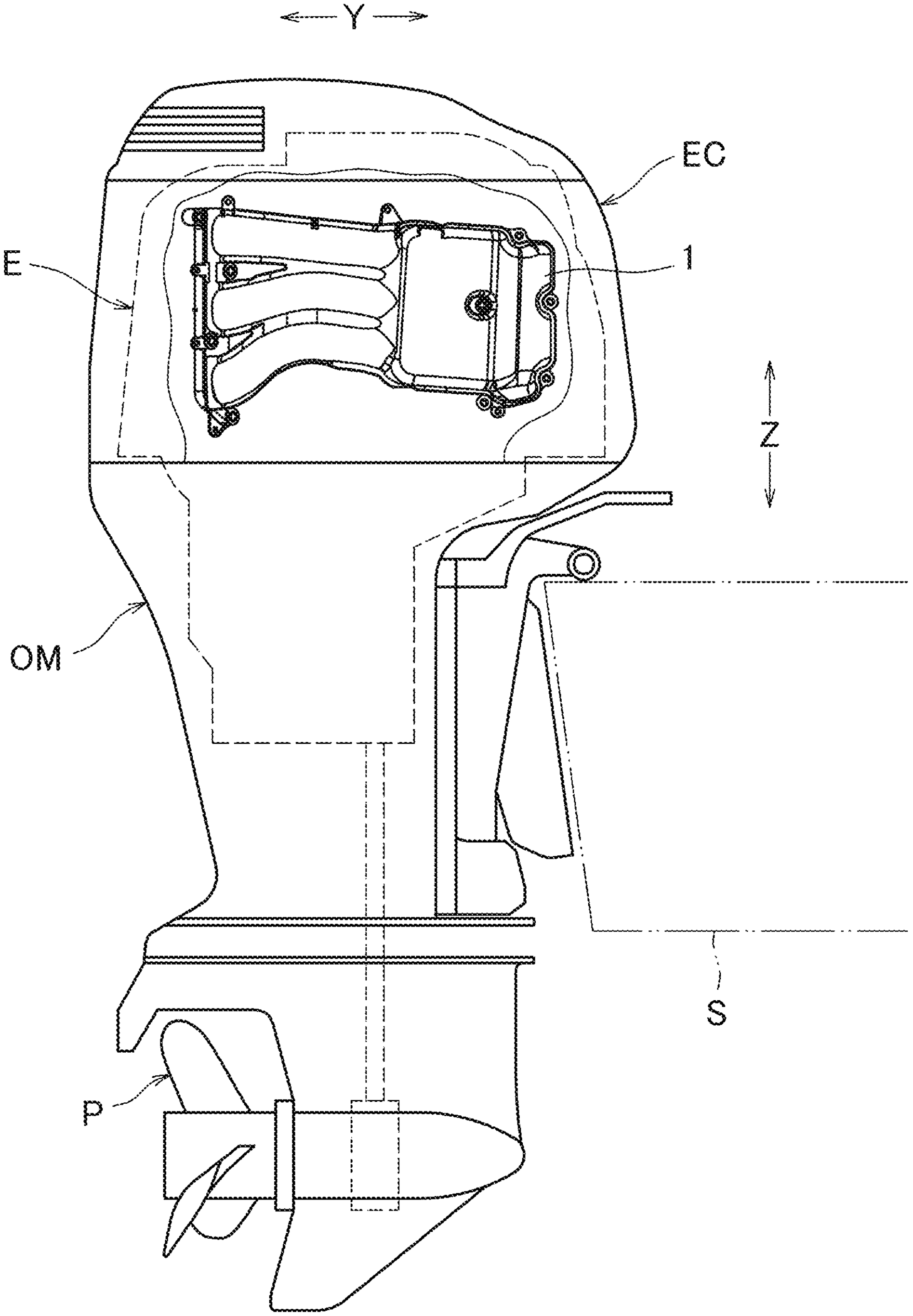
FIG. 1 is a side view of an outboard motor on which an engine employing an intake manifold according to an embodiment of the present invention is mounted.
Figure 2:
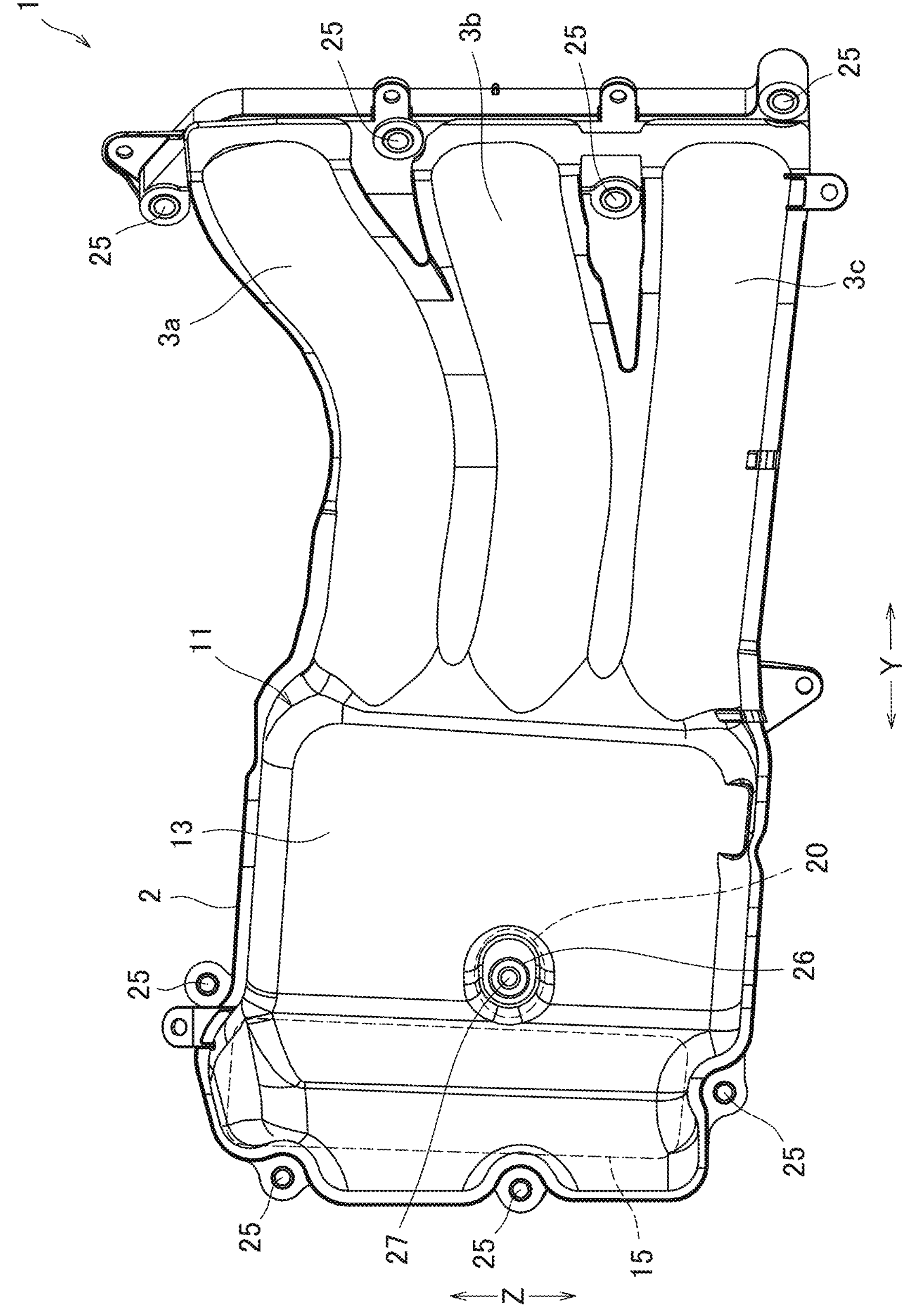
FIG. 2 is a front view of an intake manifold according to an embodiment of the present invention.
Figure 3:
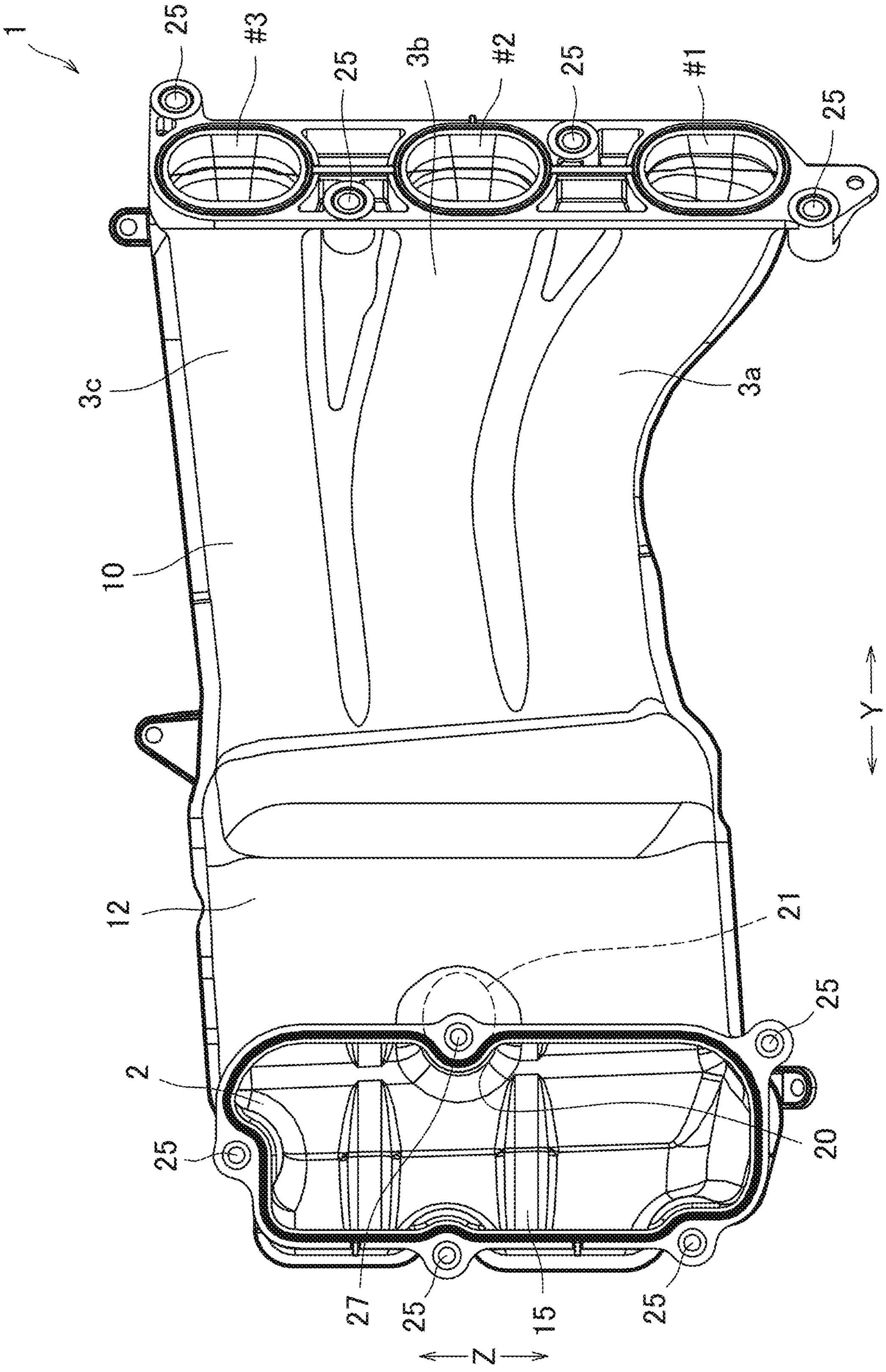
FIG. 3 is a rear view of the intake manifold according to the embodiment.
Figure 4:
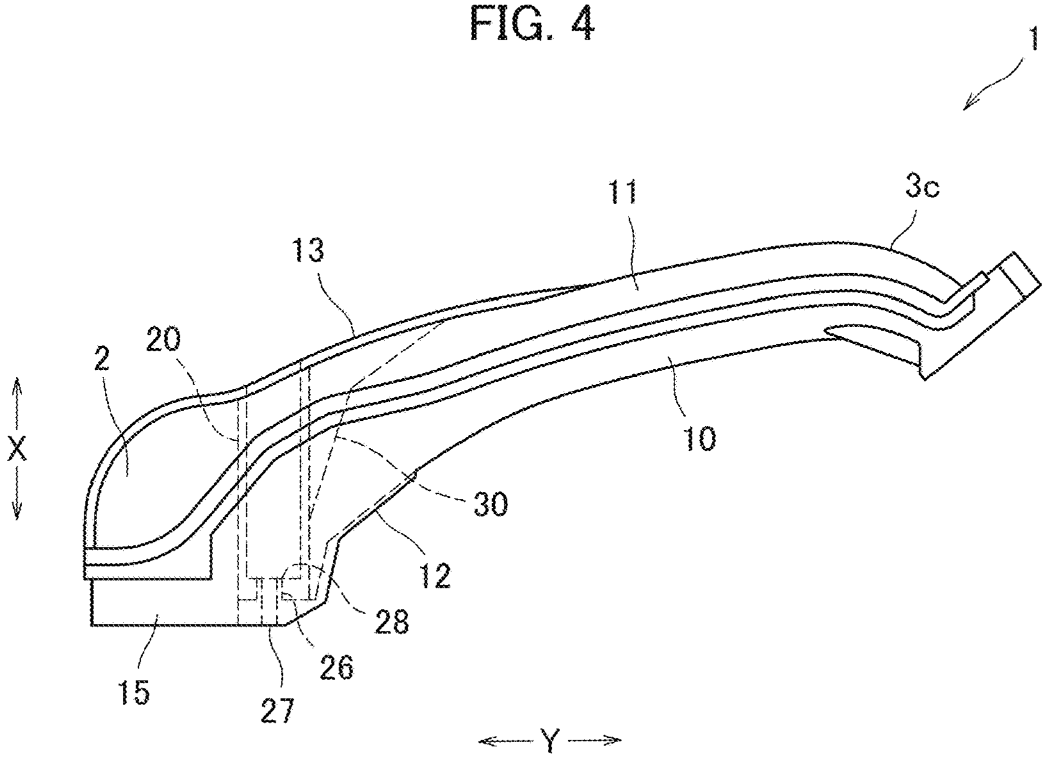
FIG. 4 is a side view of the intake manifold according to the embodiment.

FIG. 1 is a side view of an outboard motor OM on which an engine E employing an intake manifold 1 according to an embodiment of the present invention is mounted. FIG. 1 illustrates the inside by cutting a part of an engine cover EC of the outboard motor OM. FIG. 2 is a front view of the intake manifold 1 according to the embodiment of the present invention. FIG. 3 is a rear view of the intake manifold 1. FIG. 4 is a side view of the intake manifold 1. Note that the up-down direction in an example in which the intake manifold 1 is attached to the engine E of the outboard motor OM as illustrated in FIG. 1 will be defined as a Z direction, the left-right width direction (the front-rear direction in FIG. 1) of the outboard motor OM will be defined as an X direction, and the front-rear direction (the front-rear direction of a ship S) of the outboard motor OM will be defined as a Y direction for convenience of explanation.

As illustrated in FIG. 1, the intake manifold 1 according to the embodiment is employed in a relatively large multi-cylinder engine such as the engine E that drives a propeller P of the outboard motor OM, for example.

The intake manifold 1 according to the embodiment is attached to the engine E with three cylinders aligned in the up-down direction, for example. As illustrated in FIGS. 2 to 4, the intake manifold 1 includes a surge tank 2 that has a predetermined volume and receives an input of intake air from a throttle valve and three branch pipes 3*a*, 3*b*, and 3*c* that connect the surge tank 2 to intake ports of the cylinders of the engine. The three branch pipes 3*a*, 3*b*, and 3*c* are aligned in the Z direction and extend in the Y direction from one side of the surge tank 2 in the Y direction.

The intake manifold 1 is formed of a resin and is configured by a first casing 10 (first member) and a second casing 11 (second member) split in the X direction. The first casing 10 is located on the engine side, and the second casing 11 is located on the side opposite to the engine with respect to the first casing 10. Internal spaces of the surge tank 2 and the branch pipes 3*a*, 3*b*, and 3*c* are formed between an inner wall 12 (first wall surface) of the first casing 10 installed along a side surface of the engine and an outer wall 13 (second wall surface) of the second casing 11.

The inner wall 12 of the first casing 10 includes an intake port 15 through which intake air flows into the surge tank 2 at a position facing the internal space of the surge tank 2. The intake port 15 is provided at a position in the Y direction on the side opposite to the branch pipes 3*a*, 3*b*, and 3*c* as compared with the center position of the surge tank 2 in the Y direction.

Figure 5:
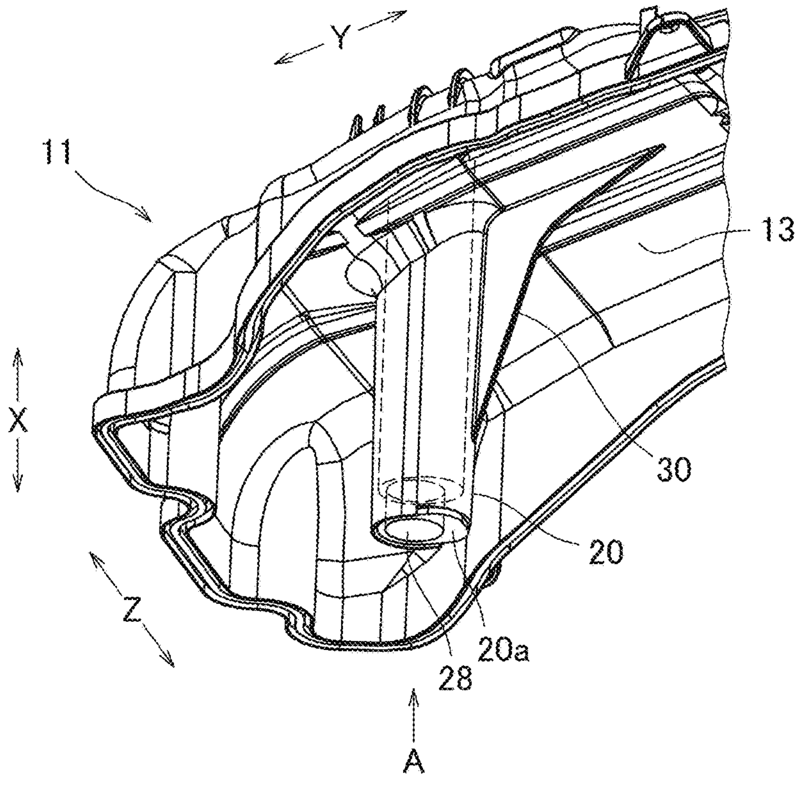
FIG. 5 is a perspective view illustrating an internal structure of a surge tank portion in a second casing according to the embodiment.
Figure 6:
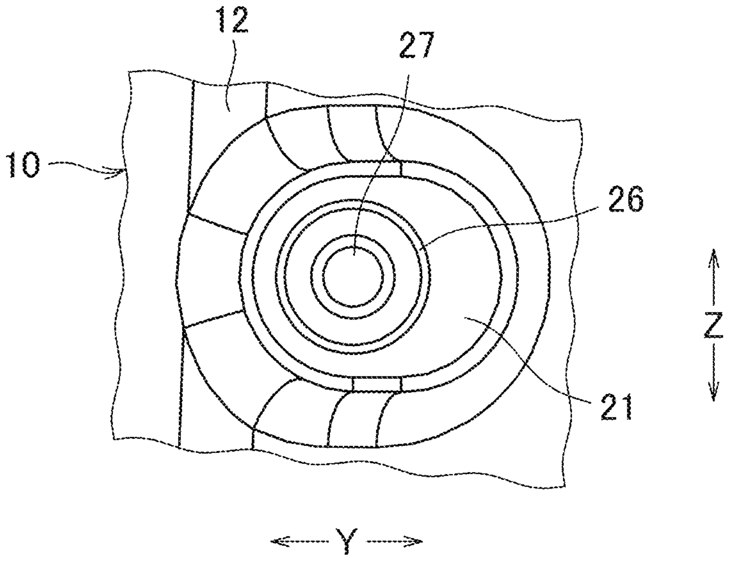
FIG. 6 is a diagram illustrating a shape of a fixation portion of a pillar portion in a first casing according to the embodiment.
Figure 7:
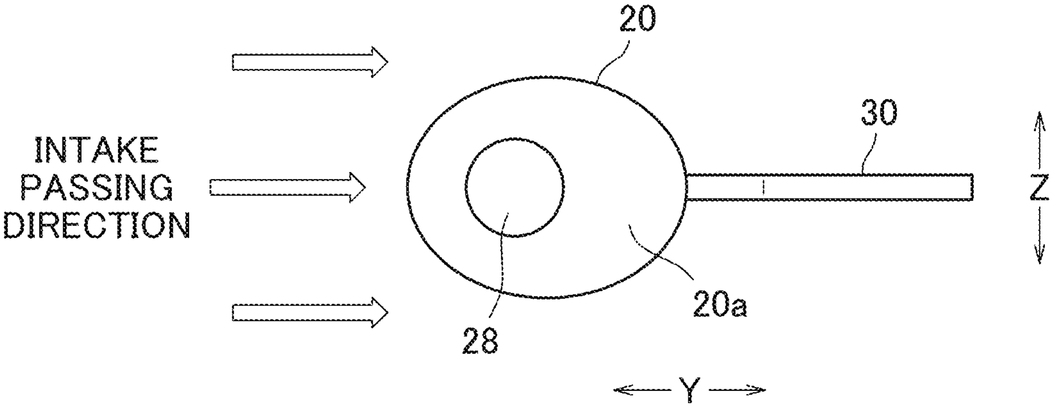
FIG. 7 is an explanatory diagram of a cross-sectional shape of the pillar portion in the first casing according to the embodiment.

FIG. 5 is a perspective view illustrating an internal structure of the surge tank 2 portion of the second casing 11. FIG. 6 is a view of a part of the first casing 10 on the side where the pillar portion 20 is welded when seen from the side of the second casing 11. FIG. 7 is a diagram illustrating shapes of the pillar portion 20 and the reinforcing rib 30 seen from A illustrated in FIG. 5 and is an explanatory diagram of the cross-sectional shape of the pillar portion 20.

As illustrated in FIG. 5, the pillar portion 20 extending in the X direction from the outer wall 13 to the first casing 10 is formed at substantially the center portion of the surge tank 2 in the second casing 11, specifically, substantially the center position of the surge tank 2 in the Z direction and the Y direction. A distal end of the pillar portion 20 abuts a recessed portion 21 provided in the inner wall 12 of the first casing 10 on the side of the internal space as illustrated in FIG. 6. The recessed portion 21 is formed by the surge tank 2 on the side of the internal space being recessed.

Outer peripheral portions and seams of the branch pipes 3*a* to 3*c* are fixed through vibration welding between the first casing 10 and the second casing 11. Also, an abutting portion between the distal end portion of the pillar portion 20 of the second casing 11 and the recessed portion 21 of the first casing 10 is also fixed through vibration welding or the like. Note that a distal end surface 20*a* of the distal end portion of the pillar portion 20 abutting and welded to the recessed portion 21 has a shape that is substantially similar to that of the cross section perpendicular to the extending direction of the pillar portion 20 and is an elliptical shape elongated in the Y direction.

As illustrated in FIGS. 2 and 3, boss portions including bolt holes 25 for fixing the intake manifold 1 to the engine are included at a plurality of locations in the outer peripheral portion of the first casing 10. As illustrated in FIGS. 4 and 6, a projecting portion 26 projecting in a cylindrical shape toward the side of the second casing 11 in the X direction is provided in the recessed portion 21 of the first casing 10. A hole portion 27 penetrates in the projecting direction (X direction) at the center portion of the projecting portion 26. A projecting portion insertion hole 28 into which the projecting portion 26 is inserted is included at the distal end portion of the pillar portion 20 of the second casing 11.

A cylindrical collar, which is not illustrated, with substantially the same length as that of the hole portion 27 is inserted into the hole portion 27. A bolt is inserted into the collar inserted into the hole portion 27 of the projecting portion 26 from the side of the second casing 11 and is caused to penetrate through the first casing 10 in the intake manifold 1 with the projecting portion 26 inserted into the projecting portion insertion hole 28 and with the first casing 10 and the second casing 11 welded, and the distal end of the bolt is fastened to a female screw portion for fixation which is provided in the engine E and is not illustrated in the drawing. The intake manifold 1 is thus fixed to the engine E at the center portion of the surge tank 2 along with the several locations in the outer peripheral portion.

Note that the size and the projecting length of the distal end portion of the projecting portion 26 are set such that a head portion of the bolt inserted into the hole portion 27 along with the collar comes into contact with the distal end portion of the projecting portion 26 and does not come into contact with the second casing 11. Therefore, at the center portion of the surge tank 2, the first casing 10 is fixed to the engine E with the bolt, and the second casing 11 is fixed to the engine E via the welded first casing 10.

As illustrated in FIG. 7, the cross section (section in the X-Y direction) perpendicular to the extending direction of the pillar portion 20 has an elliptical shape elongated in the Y direction similarly to the distal end surface 20*a* of the pillar portion 20 in the present embodiment. The pillar portion 20 is located between the intake port 15 of the intake manifold 1 and the branch pipes 3*a* to 3*c* in the Y direction, and intake air passes to flow in the Y direction near the pillar portion 20 out of the intake air flowing from the intake port 15 into the surge tank 2 and directed to the branch pipes 3*a* to 3*c*. Therefore, the cross section of the pillar portion 20 has an elliptical shape elongated in the passing direction of the intake air.

Note that the pillar portion 20 is located substantially at the center portion of the surge tank 2 in the Z direction, and the position thereof in the Z direction is substantially the same as that of the center branch pipe 3*b* from among the three branch pipes 3*a* to 3*c*. Therefore, the cross section of the pillar portion 20 is an ellipse extending toward the side of the branch pipe 3*b*.

The reinforcing rib 30 coupling the outer wall 13 of the second casing 11 to the pillar portion 20 is included as illustrated in FIGS. 4, 5, and 7. The reinforcing rib 30 is a plate-shaped member, couples a side wall of the pillar portion 20 on the side of the branch pipe 3*b* with the inner wall surface of the outer wall 13 of the second casing 11, and extends in the Y direction toward the side of the branch pipe 3*b*.

As described above, the intake manifold 1 according to the present embodiment is configured by connecting the first casing 10 and the second casing 11 and includes the pillar portion 20 coupling the inner wall 12 of the first casing 10 to the outer wall 13 of the second casing 11 at the center portion of the surge tank 2. The cross section perpendicular to the extending direction (X direction) of the pillar portion 20 has an oval shape (elliptical shape) elongated in the passing direction (Y direction) of the intake air inside the surge tank 2, and the distal end surface 20*a* of the elliptical shape of the pillar portion 20 of the second casing 11 and the first casing 10 are welded and connected at the center portion of the surge tank 2 in this structure.

Note that in the intake manifold 1 as in the embodiment, the inner wall 12 and the outer wall 13 of the surge tank 2 portion are deformed in directions in which they are separated from each other if the intake pressure rises, and the inner wall 12 and the outer wall 13 of the surge tank 2 portion are deformed in directions in which they approach each other if the intake pressure drops. Therefore, a stress is likely to concentrate on the welded portion of the pillar portion 20 in this structure by the inner wall 12 and the outer wall 13 moving with variations in intake pressure.

Figure 8:
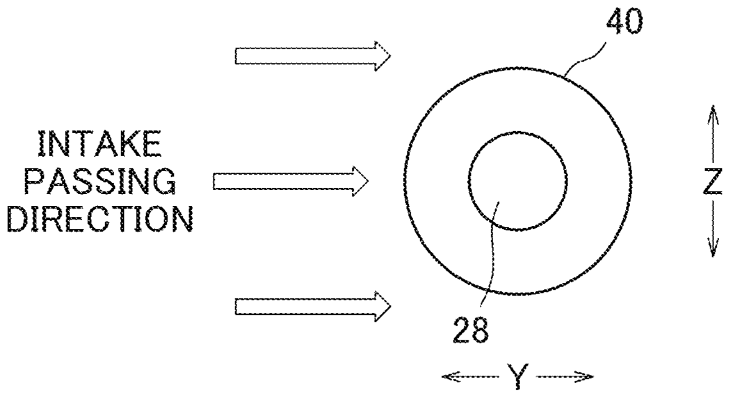
FIG. 8 is an explanatory diagram of a cross-sectional shape of a pillar portion in a first casing in a reference mode.

On the other hand, the section of the pillar portion 20 is formed into an elliptical shape with a long diameter in the Y direction in the embodiment. Therefore, it is possible to increase the sectional area and the circumferential distance of the pillar portion 20 as compared with a reference mode of a pillar portion 40 that has a circular shape with the same diameter as the short diameter of the pillar portion 20 as illustrated in FIG. 8, which will be described later, for example. In this manner, it is possible to improve the strength of the pillar portion 20 itself, to increase the area of the welded portion between the distal end surface 20*a* of the pillar portion 20 and the first casing 10, and to thereby enhance the strength of the welded portion. In particular, it is possible to effectively alleviate stress concentration, to reduce damage (peeling-off) of the welded portion between the first casing 10 and the second casing 11, and to significantly enhance the pressure resisting strength of the intake manifold 1 by increasing the sectional area of the welded portion on which a stress concentrates with variations in intake pressure as described above.

Furthermore, since the pillar portion 20 is formed into an elliptical shape with a long diameter on the passing direction side of the intake air inside the surge tank 2, it is possible to reduce disturbance of a flow of intake air passing near the pillar portion 20 and to reduce an increase in pressure loss inside the surge tank 2 even if the sectional area of the pillar portion 20 is caused to increase as compared with a circle.

Furthermore, since the reinforcing rib 30 coupling the outer wall 13 of the second casing 11 to the pillar portion 20 is included, it is possible to enhance the strength near the proximal portion of the pillar portion 20 of the second casing 11. It is thus possible to further enhance the pressure resisting strength of the intake manifold 1.

Since the reinforcing rib 30 extends in the passing direction of the intake air, it is possible to reduce an increase in pressure loss inside the surge tank 2 caused by the reinforcing rib 30 being included.

Figure 9:
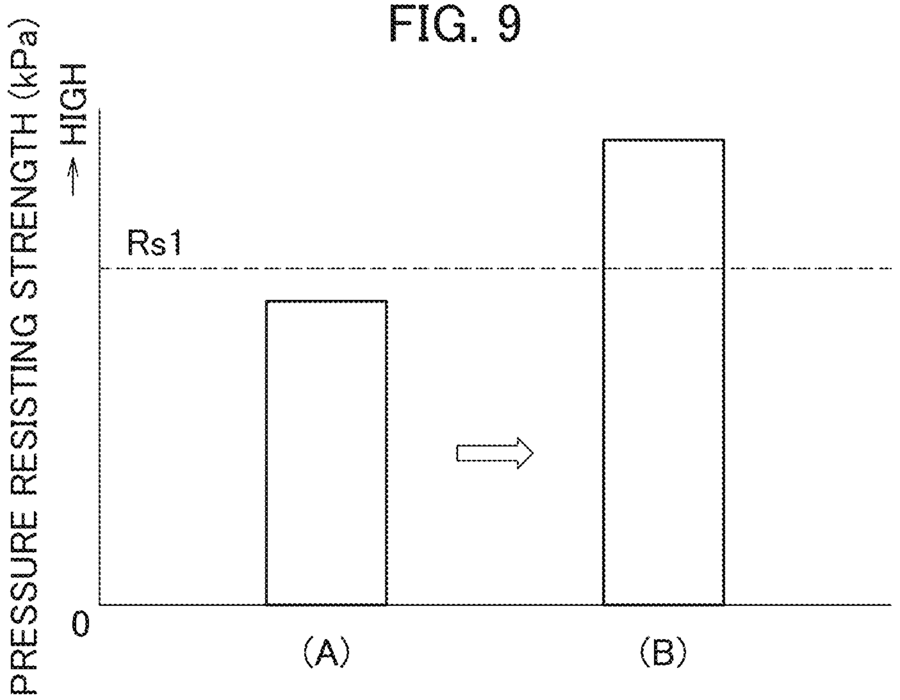
FIG. 9 is an example of a graph comparing a pressure resisting strength in the reference mode and a pressure resisting strength in the embodiment.
Figure 10:
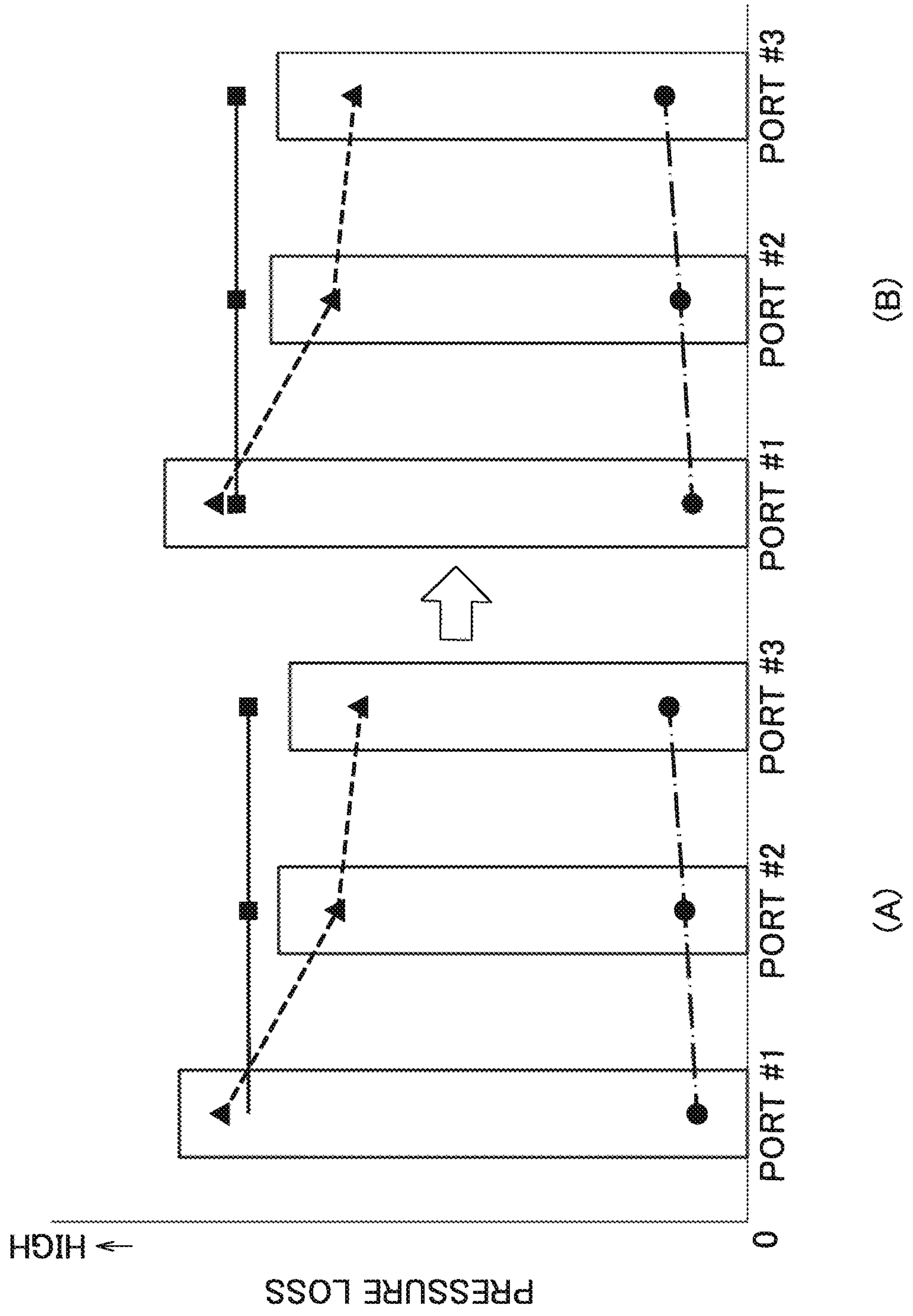
FIG. 10 is an example of a graph comparing a pressure loss in the reference mode and a pressure loss in the embodiment.
Figure 11:
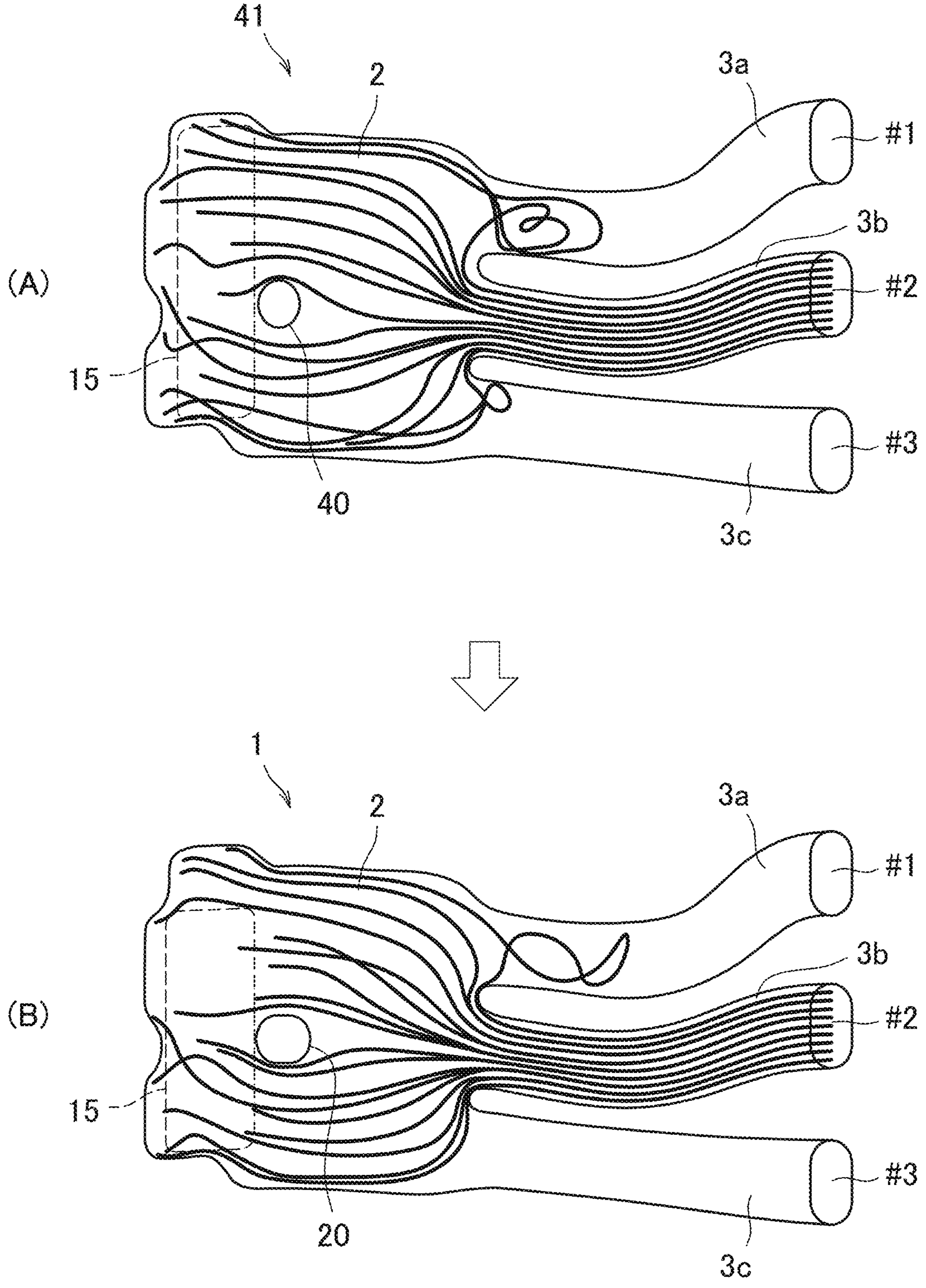
FIG. 11 is an example of a diagram in which intake flows inside intake manifolds are visualized in the reference mode and the embodiment.

FIG. 8 is a diagram illustrating a cross-sectional shape of a pillar portion of a first casing in the reference mode. FIG. 9 is an example of a graph comparing pressure resisting strength in the reference mode and the pressure resisting strength in the embodiment. FIG. 10 is an example of a graph comparing a pressure loss in the reference mode and the pressure loss in the embodiment. FIG. 11 is an example of a diagram in which flows of intake air inside the intake manifold are visualized. As illustrated in FIG. 8, the reference mode is an intake manifold 41 in which the section of the pillar portion 40 has a circular shape with the same diameter as the short diameter of the pillar portion 20 in the embodiment and the reinforcing rib 30 is not included, and the other components are the same as those of the intake manifold 1 according to the embodiment. Note that in FIG. 10, pressure losses from the intake port 15 to a port #1 of the branch pipe 3*a*, from the intake port 15 to a port #2 of the branch pipe 3*b*, and from the intake port 15 to a port #3 of the branch pipe 3*c* in each of (A) the reference mode and (B) the embodiment are illustrated by bar graphs. Also, an average value of three pressure losses from the intake port 15 to the ports #1 to #3 is illustrated by a solid line, each of pressure losses inside the surge tank 2 out of the pressure losses from the intake port 15 to the ports #1 to #3 is illustrated by a one-dotted dashed line, and a pressure loss at each of the branch pipes 3*a* to 3*c* is illustrated by a broken line in FIG. 10.

In FIG. 11, a flow of intake air from the intake port 15 to the port #2 out of intake air flowing from the intake port 15 to each of the ports #1 to #3 is illustrated by a solid line.

In comparison through experiments between the intake manifold 1 in the embodiment and the intake manifold 41 in the reference mode including the pillar portion 40 with a circular section and without the reinforcing rib 30, it was found out that the pressure resisting strength of the intake manifold 1 in the embodiment was significantly improved as compared with the reference mode as illustrated in FIG. 9. It is thus possible to achieve a pressure resisting strength that is higher than a required pressure resisting strength Rs1 by the intake manifold 1, for example.

On the other hand, it was found out that the pressure losses at all of the ports #1 to #3 were substantially the same as illustrated in FIG. 10 in the embodiment and the reference mode.

Note that although the pressure loss at the port #1 is higher than those at the ports #2 and #3 in FIG. 10, this is mainly because of influences of the branch pipe 3*a* having a more complicated shape than the other branch pipes 3*b* and 3*c* in the embodiment.

While the pressure losses at the ports #1 and #3 are slightly higher in the embodiment than in the reference mode, the pressure losses at the ports #2 are substantially the same in the reference mode and the embodiment. This is because an intake rectification effect of the reinforcing rib 30 is significantly reflected to the port #2 passing through the branch pipe 3*b* located the closest to the pillar portion 20.

Although the embodiment has been described hitherto, aspects of the present invention are not limited to the above embodiment. For example, only forming of the section of the pillar portion 20 into the elliptical shape may be executed out of the forming of the section of the pillar portion 20 of the intake manifold 1 into the elliptical shape and providing of the reinforcing rib 30.

Moreover, the elliptical shape of the pillar portion 20 and the shape of the reinforcing rib 30 may be appropriately changed. For example, the section of the pillar portion 20 may not be the elliptical shape, the width thereof in the Z direction may be gradually reduced toward the downstream side in the passing direction of the intake air or an egg shape may be employed, and it is only necessary that the section have an oval shape that is longer in the Y direction, which is the passing direction of the intake air, than in the Z direction.

The position of the pillar portion 20, the shape of the pillar portion 20 such as a cross-section extending direction, and the extending direction of the reinforcing rib 30 may be appropriately changed in accordance with disposition of each of the branch pipes 3*a* to 3*c* with respect to the surge tank 2, the shape of each of the branch pipes 3*a* to 3*c*, and the shape of the internal space of the surge tank, that is, intake passing aspects inside the intake manifold 1. For example, the pillar portion 20 may be formed into a shape in which the sectional area of cross section differs depending on positions in the extending direction of the pillar portion 20 to further reduce a pressure loss in the intake manifold 1.

Although the pillar portion 20 is provided in the second casing 11 on the side opposite to the side of the engine E in the embodiment, the pillar portion 20 may be provided in the first casing 10 on the side of the engine E.

Although the three branch pipes 3*a* to 3*c* are included for the three-cylinder engine E in the embodiment, the present invention is not limited thereto and can be applied to engines with various numbers of cylinders. The installation direction of the intake manifold 1 is also not limited. Moreover, the present invention can be widely applied to intake manifolds for engines other than that for an outboard motor.

What is claimed is:

1. An intake manifold to be applied to an engine with a plurality of cylinders, comprising:

a surge tank into which intake air flows; and branch pipes branched from the surge tank and connected to intake ports of the engine, wherein the surge tank includes an internal space formed between a first wall surface and a second wall surface facing each other, the first wall surface and the second wall surface are connected with a pillar portion penetrating through a substantially center portion of the internal space, a cross section of the pillar portion perpendicular to an extending direction of the pillar portion has an oval shape elongated in a passing direction of the intake air in the internal space, and a distal end portion having a distal end surface of the pillar portion abuts against a recessed portion of the first wall surface and is connected by welding, the recessed portion is formed by the surge tank on a side of the internal space of the first wall surface being recessed, the distal end surface of the pillar portion has a shape that is substantially similar to that of the cross section perpendicular to the extending direction of the pillar portion and is an elliptical shape elongated in a side of the branch pipes, and holes through which a bolt is insertable are formed at positions where the distal end surface of the pillar portion and the recessed portion face each other.

2. The intake manifold for the engine according to claim 1, comprising:

a plate-shaped reinforcing rib connecting the pillar portion to at least one of the first wall surface and the second wall surface, wherein the plate-shaped reinforcing rib is disposed to extend in the passing direction.

3. The intake manifold for the engine according to claim 1, wherein the pillar portion has a cross-sectional area of the cross section differs depending on a position in the extending direction of the pillar portion.

4. The intake manifold for the engine according to claim 1, wherein the intake manifold is configured by connecting a first member including any one of the first wall surface and the second wall surface to a second member including the pillar portion and any one of other of the first wall surface and the second wall surface.

5. The intake manifold for the engine according to claim 1, wherein the intake manifold is formed of a resin.

6. The intake manifold for the engine according to claim 1, wherein, the recessed portion is provided with a projecting portion projecting in a cylindrical shape toward a side of the internal space of the second wall surface, and a hole that penetrates a center of the projecting portion in a direction of the projecting, and the distal end portion is provided with a projecting portion insertion hole into which the projecting portion is inserted.

* * * * *